United States Patent [19]
Rubenstein

[11] Patent Number: 5,547,134
[45] Date of Patent: Aug. 20, 1996

[54] METHOD OF PROCESSING AND RECOVERY OF ELECTRONIC AND ELECTRIC SCRAP

[76] Inventor: Julius Rubenstein, Sirenevuy Boulevard, 3b, Apt 20, Moscow, 105077, Russian Federation

[21] Appl. No.: 471,169

[22] Filed: Jun. 6, 1995

[51] Int. Cl.⁶ ............................ B02C 19/12; B02C 23/08
[52] U.S. Cl. ..................... 241/23; 241/24.14; 241/24.18; 241/29
[58] Field of Search ................................ 241/23, 24, 29, 241/DIG. 38, 24.14, 24.18

[56] References Cited

U.S. PATENT DOCUMENTS

| | | | |
|---|---|---|---|
| 3,885,744 | 5/1975 | Drage | 241/23 |
| 5,071,075 | 12/1991 | Wiens | 241/19 |
| 5,139,203 | 8/1992 | Alavi | 241/20 |
| 5,174,509 | 12/1992 | Starke et al. | 241/24 |
| 5,217,171 | 6/1993 | Feldman | 241/24 |
| 5,377,920 | 1/1995 | Alavi et al. | 241/17 |
| 5,411,213 | 5/1995 | Just | 241/16 |
| 5,431,347 | 7/1995 | Hayashi et al. | 241/23 |

*Primary Examiner*—John Husar
*Attorney, Agent, or Firm*—Alfred E. Miller

[57] ABSTRACT

The method of processing electronic and electrical scrap materials wherein the components and substrate are initially separated and the components, such as base metals, ceramics and precious metals are recovered, and the process includes double vibrating screens which classify the components according to size.

6 Claims, 1 Drawing Sheet

METHOD OF PROCESSING AND RECOVERY OF ELECTRONIC AND ELECTRIC SCRAP

The present invention relates to a method and apparatus for processing scrap materials from discarded electronic and electrical products including computers, hook up cables, electrical equipment and telecommunication products because new software and new processor architectures that become available every few years renders obsolete the old equipment in an office. Consequently, the old equipment has to be disposed of. Thus, millions of tons of electronic and electrical equipment becomes waste and because of stringent environmental laws now in place must be properly recycled, and cannot be disposed in bulk in landfills.

It is known that scrap materials in computers, keyboards and monitors have value when separated and recovered from the base material of electronic scrap. The electronic scrap consists of base metals, ceramics and precious metals such as gold, silver, and platinum. However, due to the varying nature of electronic components a method of reclamation is necessary which will give an optimum recovery from various feedstock materials.

The need for processing scrap electronic equipment in order to recover precious ferrous and non-ferrous metals as well as circuit boards having plastic and ceramic materials was recognized in U.S. Pat. No. 5,139,203 to Lally as well as U.S. Pat. No. 5,217,171 to Feldman. U.S. Pat. No. 5,139,203 describes a method of recovery of scrap goods including a number of steps which starts with little separation in dry steps and ends in wet chemical separation and electrolytic separation. The same is true of U.S. Pat. No. 5,217,171 which shows a series of steps for processing electromagnet scrap which is a first wet process step and a second step of hydro-metallurgical processing in which a non-ferrous metal passes into a solution and the precious metals form a solid sediment.

The prior art patents cited above do not provide for a more complete separation of the components in the initial steps of the separation procedure prior to the hydro-metallurgical processing. On the other hand, applicant's process or method provides for a more complete separation of the selected components in the various steps of the process so that a rich concentrate results whereby the following hydro-metallurgical processing is easily accomplished.

It is an object of the present invention to provide for the recovery of non-ferrous materials from different electronic or electrical scrap and optimize the recovery for the various elements in the scrap, as well as having the capability of changing the parameters of the process in order to obtain the best recovery of selected materials.

It is a further object of the present invention to provide an initial double screen for separating out particles wherein the larger particles of over 13 mm are returned to the crusher and the smaller particles of 3 to 13 mm go to a magnetic separator while smaller particles under 3 mm are directed to a dust collector. Because of classifying the various particles according to size, these particles can be handled separately in the most efficient manner for recovery of both magnetic and non-magnetic materials.

It is a further object of the present invention to provide pre-treatment steps in order to facilitate and maximize the recovery of selected materials. It is an object of the present invention to provide a process for recovering metallic and non-metallic constituents from electric and electronic scrap goods which constitutes pre-treatment stages that results in reduced energy consumption necessary for crushing the electronic scrap goods. In the pre-treatment steps or stages, a separator is utilized to separate the circuit board, which is normally fabricated of plastic from the components thereon. Thus, the pre-treatment steps facilitate and maximize the recovery of selected materials.

It is another object of the present invention to selectively change the sequence and distribution of the material flow when recovering electronic scrap in order to optimize the recovery of said scrap.

It is another object of the present invention to provide a pressing step prior to the crushing step in the process wherein said pressing step changes the integrity of the structure as well as the components therein.

It is yet another object of the present invention to have the capability of changing the material flow depending on the properties of the material to be processed and, consequently, to achieve the maximum recovery of selected materials.

The above and other objects and features of the invention will become apparent by reference to the following description of my invention and the drawing.

BRIEF DESCRIPTION OF THE DRAWING

The sole figure of the drawing shows a schematic flow chart method in accordance with the teachings of my invention.

METHOD OF THE INVENTION

Figure 1:
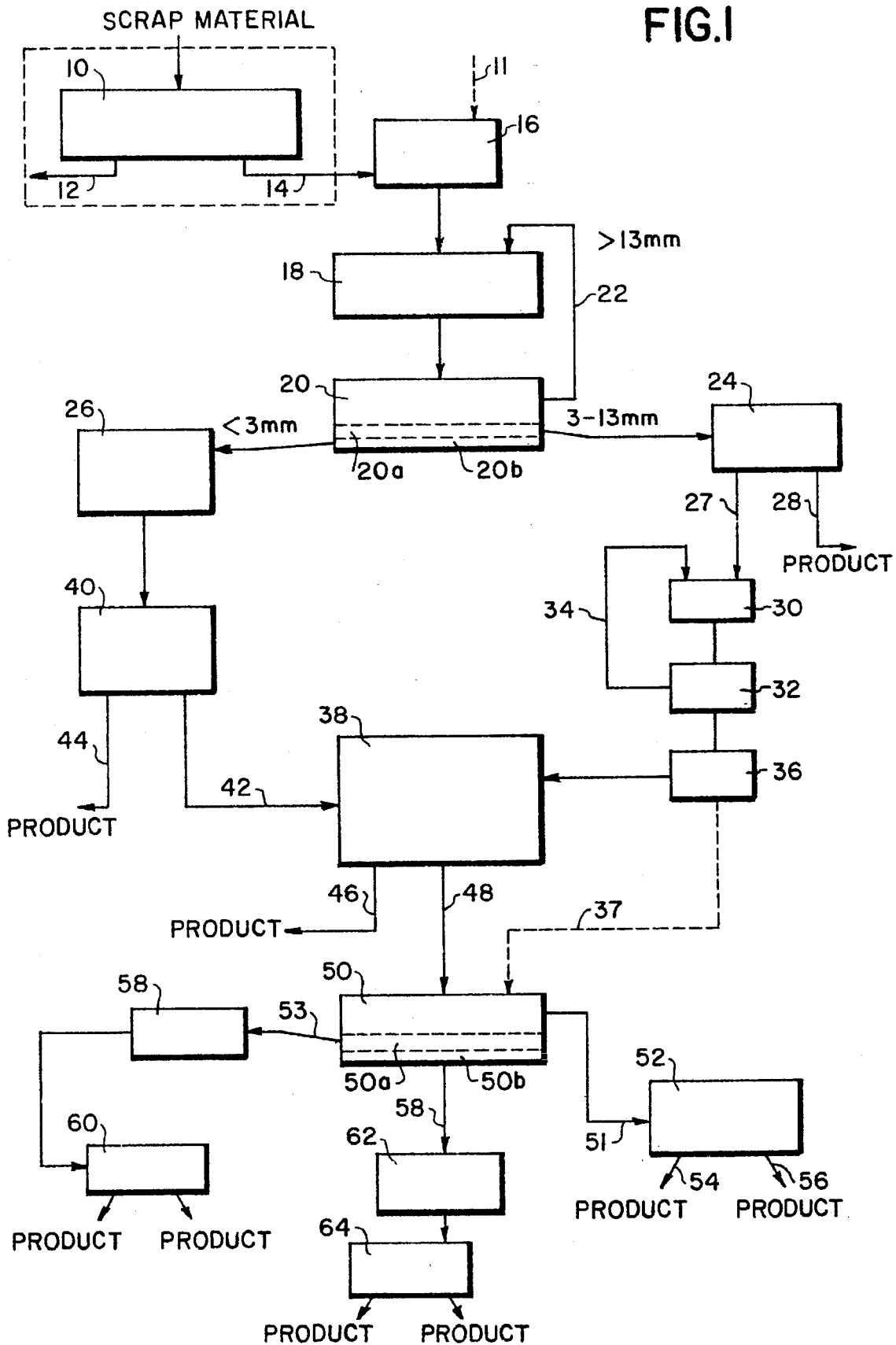

The processing of electronic or electric scrap material is usually initiated with two preliminary steps. In the first step separator 10 by thermal treatment, separates the plastic substrate 12 from the electronic or electric components 14 and the components then are directed into a mechanism 16 for a pressing step which changes the integrity of the components. In some instances it is not necessary to use the first step since the components have already been separated from the substrates. In that case, the feed material comes into the pressing step directly.

Materials or components are then directed from the pressing step to a crusher and from the crushing step the components go directly to a vibrating screen 20 having an upper screen 20(*a*) and a lower screen 20(*b*). Furthermore, large particles which are over 13 mm in diameter are directed back to the crushing step by the conduit 22. The medium size particles between 3–13 mm are directed to a magnetic separator 24 while the smaller particles which are less than 3 mm are directed to the dust collector 26.

The magnetic separator 24 divides the components into non-magnetic line 27 while the magnetic particles are taken out of the system or products ready for use through line 28. The non-magnetic particles coming from the separator 24 then are directed through a crushing step 30 and then through a vibrating screen 32. The larger particles in screen 32 are directed back through line 34 to the crushing step 30 for further crushing. The components that are screened out in screen 32 go to a dust collector 36 which are in the order of less than 3 mm. The particles in dust collector 36 are directed to a high powered magnetic separator 38.

The non-magnetic components in dust collector 36 may, in some instances, eliminate passing into the high power magnetic separator 38 and go directly to the screen 50 as shown in the dotted lines identified by the reference numeral 37.

The particles that are smaller than 3 mm go from vibrating double screen 20 to the dust collector 26 and thereafter to a magnetic separator 40. In the magnetic separator 40 the components are divided in which the non-magnetic components pass through line 42 to the high power magnetic separator 38 while the magnetic components are ready products for use which are directed through line 44 out of the system.

The magnetic separator 38 separates the magnetic components through line 46 to exit from the system while the non-magnetic particles pass through line 48 into screen 50 having double vibrating screens 50(*a*) and 50(*b*). In the screen 50 larger particles without passing through either screen 50(*a*) or 50(*b*) are directed to an electrostatic separator 52 through line 51. The separator 52 divides the components into ready products for use exiting the system which are on the one hand plastic or ceramic through line 54, and on the other hand, non-ferrous metals through line 56.

The medium size particles are directed after passing through screen 50(*a*) of screen 50 into dust collector 58 through line 53 and then into an electrostatic separator 60 into a ready product for use such as plastic or ceramic and another ready product for use such as non-ferrous metals, both of said ready products for use exiting the system.

Finally, the smallest particles which pass through screens 50(*a*) and 50(*b*) go to a dust collector 62 through line 57 and then to an electrostatic separator 64 in which the remaining components are separated into a plastic or ceramic ready product for use and a non-ferrous metal ready product for use, both of which exit the system.

Although the present invention method has been disclosed and described with reference certain embodiments thereof, it should be apparent that other variations and modifications may be made, and it is intended that the following claims cover said variations and modifications within the true spirit of the invention.

What I claim is:

1. A method of processing and recovery of magnetic, non-magnetic and plastic materials from electronic or electrical scrap equipment comprising the steps of:

(a) separating by thermal or mechanical treatment the plastic substrate and components, (b) pressing the components to change the integrity of said components, (c) mechanically crushing said components to reduce the size of said components, (d) passing the crushed components into a first double vibrating screens wherein the intermediate size components are directed to a first magnetic separator and the smaller size particles are directed to a first dust collector, (e) returning the larger size particles to said crushing step before they pass through said double screen for further reducing the size of said components, (f) recovering the magnetic components from said magnetic separator as a product ready for use, (g) passing the non-magnetic components to another mechanical crusher to further reduce the size of said components, (h) passing the components through a second vibrating screen and thereafter into a second dust collector, and passing the components therein into a high power magnetic separator.

(i) passing the components present in said first dust collector to a second magnetic separator, (j) passing the magnetic components from said second magnetic separator and second dust collector to said high power magnetic separator, and (k) means for separating said plastic components and the non-ferrous metal products and recovering the same as products ready for use.

2. The method as claimed in claim 1 comprising a further step of directing said non-magnetic components from said second dust collector directly to said second vibrating screen and bypassing said high power magnetic separator.

3. A method of processing and recovery of magnetic, non-magnetic and plastic materials from electronic or electrical scrap equipment comprising the steps of:

(a) feeding the components of said scrap material into an apparatus for pressing the components to change the integrity of said components, (b) mechanically crushing said components to reduce the size of said components, (c) passing the crushed components into a first double vibrating screens wherein the intermediate size components are directed to a first magnetic separator and the smaller size particles are directed to a first dust collector, (d) returning the larger size particles to said crushing step before they pass through said double screen for further reducing the size of said components, (e) recovering the magnetic components from said magnetic separator as a product ready for use, (f) passing the non-magnetic component to another mechanical crusher to further reduce the size of said components, (g) passing the components through a second vibrating screen and thereafter into a second dust collector, and passing the components therein into a high power magnetic separator, (h) passing the components present in said first dust collector to a second magnetic separator, (i) passing the magnetic components from said second magnetic separator and second dust collector to said high power magnetic separator, and (j) means for separating said plastic components and the non-ferrous metal products and recovering the same for use as ready products.

4. The method as claimed in claim 3 wherein said means for separating said plastic components and the non-ferrous metal products includes said second double vibrating screen which separates said components by size and directs them either to a dust collector or an electrostatic separator.

5. The method as claimed in claim 3 further separating said components and exiting the same out of the system as non-metallic products and non-ferrous metals.

6. The method as claimed in claim 3 wherein the last step in the method utilizes a plurality of electrostatic separators for separating out components according to size.

\* \* \* \* \*